United States Patent
Szepek et al.

(10) Patent No.: US 7,966,802 B2
(45) Date of Patent: Jun. 28, 2011

(54) METHODS AND APPARATUS FOR OPERATING GAS TURBINE ENGINE SYSTEMS

(75) Inventors: Scott William Szepek, Glenville, NY (US); Bryan Edward Sweet, Valatie, NY (US); Lauren Jeanne Buchalter, Taylors, SC (US); David Andrew Stats, Clifton Park, NY (US); Michael John Mariani, Greer, SC (US)

(73) Assignee: General Electric Company, Schenectady, NY (US)

( * ) Notice: Subject to any disclaimer, the term of this patent is extended or adjusted under 35 U.S.C. 154(b) by 1057 days.

(21) Appl. No.: 12/026,230

(22) Filed: Feb. 5, 2008

(65) Prior Publication Data
US 2009/0193788 A1 Aug. 6, 2009

(51) Int. Cl.
  *F02C 9/00* (2006.01)
  *F02G 3/00* (2006.01)
(52) U.S. Cl. .................................. 60/39.281; 60/776
(58) Field of Classification Search ............... 60/39.281, 60/39.463, 39.465, 734, 737, 746, 747, 776, 60/39.27, 772
See application file for complete search history.

(56) References Cited

U.S. PATENT DOCUMENTS

| | | | |
|---|---|---|---|
| 4,761,948 A * | 8/1988 | Sood et al. | 60/39.281 |
| 5,288,149 A * | 2/1994 | Meyer | 374/36 |
| 5,743,079 A | 4/1998 | Walsh et al. | |
| 6,230,103 B1 | 5/2001 | DeCorso et al. | |
| 6,490,867 B2 * | 12/2002 | Braun et al. | 60/776 |
| 6,655,151 B2 | 12/2003 | Mahoney et al. | |
| 6,751,942 B2 | 6/2004 | Mahoney et al. | |
| 6,813,875 B2 | 11/2004 | Inoue | |
| 7,007,485 B2 | 3/2006 | Pashley et al. | |
| 7,143,003 B2 | 11/2006 | Certain | |
| 7,216,486 B2 * | 5/2007 | Doebbeling et al. | 60/773 |
| 7,287,515 B2 | 10/2007 | Okamura et al. | |
| 7,472,540 B2 * | 1/2009 | Berenbrink et al. | 60/39.281 |
| 7,565,805 B2 * | 7/2009 | Steber et al. | 60/776 |
| 7,685,803 B2 * | 3/2010 | Rebhan et al. | 60/39.463 |
| 7,854,110 B2 * | 12/2010 | LaGrow et al. | 60/39.281 |
| 2006/0275633 A1 | 12/2006 | Agnew et al. | |
| 2007/0113560 A1 * | 5/2007 | Steber et al. | 60/773 |
| 2007/0130911 A1 | 6/2007 | Goldberg et al. | |
| 2008/0034731 A1 | 2/2008 | Pashley | |
| 2009/0125207 A1 * | 5/2009 | Nomura et al. | 701/100 |
| 2009/0138170 A1 * | 5/2009 | Nemet et al. | 701/100 |
| 2009/0271085 A1 * | 10/2009 | Buchalter et al. | 701/100 |
| 2010/0162678 A1 * | 7/2010 | Annigeri et al. | 60/39.281 |
| 2010/0269515 A1 * | 10/2010 | Kishi et al. | 60/773 |
| 2010/0275609 A1 * | 11/2010 | Snider | 60/773 |

* cited by examiner

*Primary Examiner* — William H Rodríguez
(74) *Attorney, Agent, or Firm* — Armstrong Teasdale LLP

(57) ABSTRACT

Methods and systems for operating a gas turbine engine system are provided. The system includes a fuel control system. The fuel control system includes a plurality of sensors positioned about the gas turbine engine system and configured to measure at least one parameter associated with the sensor, and a processor programmed to receive a signal from at least one of the plurality of sensors indicative of a composition of the fuel. The processor is further programmed to determine the physical properties of a fuel at an inlet to the flow control devices using a flow model and the at least one signal, determine a corresponding correction to a gas fuel flow gain using the determined physical properties, and automatically control fuel delivery as well as fuel split between the fuel injection points on the combustor using the adjusted flow gain to facilitate permitting a relatively large variation in the fuel composition for use in the gas turbine engine.

20 Claims, 3 Drawing Sheets

METHODS AND APPARATUS FOR OPERATING GAS TURBINE ENGINE SYSTEMS

BACKGROUND OF THE INVENTION

This invention relates generally to gas turbine engines, and more particularly, to methods and apparatus for controlling the operation of gas turbine engines.

Gas turbine engines typically include a compressor section, a combustor section, and at least one turbine section. The compressor compresses air, which is mixed with fuel and channeled to the combustor. The mixture is then ignited generating hot combustion gases. The combustion gases are channeled to the turbine, which extracts energy from the combustion gases for powering the compressor, as well as producing useful work to power a load, such as an electrical generator, or to propel an aircraft in flight.

Gas turbine engines operate in many different operating conditions, and combustor performance facilitates engine operation over a wide range of engine operating conditions. Controlling combustor performance may be used to improve overall gas turbine engine operations. More specifically, permitting a larger variation in gas fuel composition, for example, heating value and specific gravity, while maintaining $NO_x$ emissions and combustion dynamics levels within predetermined limits. Gas turbines equipped with Dry Low $NO_x$ (DLN) combustion systems typically utilize fuel delivery systems that include multi-nozzle, premixed combustors. DLN combustor designs utilize lean premixed combustion to achieve low $NO_x$ emissions without using diluents such as water or steam. Lean premixed combustion involves premixing the fuel and air upstream of the combustor flame zone and operation near the lean flammability limit of the fuel to keep peak flame temperatures and $NO_x$ production low. To deal with the stability issues inherent in lean premixed combustion and the wide fuel-to-air ratio range that occurs across the gas turbine operating range, DLN combustors typically have multiple fuel nozzles in each combustion chamber that are fueled individually or in sub-groups. The gas turbine fuel system has a separately controlled delivery circuit to supply each group of nozzles in each chamber. The control system varies the fuel flow (fuel split) to each circuit over the turbine operating range to maintain flame stability, low emissions, and acceptable combustor life. Fuel flow to each nozzle sub-group is controlled via a gas control valve (GCV). The fuel split acts to divide the total fuel command (Fuel Stroke Reference) amongst the active GCV's, and the resulting percentage GCV fuel flow command is converted to a valve position to achieve the desired fuel flow to the nozzle sub-group.

To convert the percentage GCV flow command to valve position, a gas fuel system flow gain in terms of valve flow capacity coefficient, $C_g$ is determined. The valve capacity coefficient is translated to valve position using the known valve flow characteristic. This allows the use of multiple valves with varying capacities. The flow gain, also called GCV flow scalar, is based on the maximum required $C_g$ during the maximum fuel flow operating condition.

The inputs used to calculate the flow gain are dependant on fuel constituents and the application of this flow conversion technique is limited to applications with fairly constant fuel properties. Traditional methods using the flow gain assume the fuel properties are constant throughout the loading range, which is not always the case. Therefore, without correcting for changes in fuel properties the flow gain will not properly linearize the flow command across the loading range. This can lead to an undesirable droop non-linearity and can cause load transients when fuel properties change significantly, for example during fuel transfers or following large changes in fuel temperature.

Prior techniques have used biases to the flow gain where an actual to design gas temperature was used to bias the flow gain, however this type of correction generally accounts for fuel temperature, and fuel composition is assumed to be relatively constant. However, when power augmentation systems are used, like a fuel moisturization system, the magnitude of the changes in fuel physical properties is significant, and a new technique is needed to accurately calculate the correct flow gain.

BRIEF DESCRIPTION OF THE INVENTION

In one embodiment, a gas turbine engine includes an electrical generator configured to provide electrical energy to a load, a gas turbine engine including at least one combustor including a plurality of fuel injection points configured to receive a flow of fuel from a plurality of corresponding flow control devices, and a fuel control system. The fuel control system includes a plurality of sensors positioned about the gas turbine engine system and configured to measure at least one parameter associated with the sensor and a processor. The processor is programmed to receive a signal from at least one of the plurality of sensors indicative of a composition of the fuel, using a flow model and the at least one signal, determine the physical properties of a fuel at an inlet to the flow control devices, determine a corresponding correction to a gas fuel flow gain using the determined physical properties, and automatically control fuel delivery as well as fuel split between the fuel injection points on the combustor using the adjusted flow gain to facilitate permitting a relatively large variation in the fuel composition for use in the gas turbine engine.

In another embodiment, a method of operating a gas turbine engine includes receiving a signal indicative of a composition of the fuel, determining physical properties of the fuel at an inlet to at least one flow control device using a flow model and the fuel composition signal, determining a corresponding correction to a gas fuel flow gain using the determined physical properties, and automatically control fuel delivery as well as fuel split between the fuel injection points on the combustor using the adjusted flow gain.

In yet another embodiment, a fuel control system includes a fuel inlet configured to admit a flow of fuel into the fuel control system, a fuel moisturizer coupled in flow communication with the fuel inlet through a first pipe component, at least one flow control device configured to modulate flow to one or more injection points in a fuel control system load, at least one flow control device coupled in flow communication with a fuel moisturizer through a second pipe component, a plurality of sensors positioned about the fuel control system and configured to measure at least one parameter associated with the sensor, and a processor. The processor is programmed to receive a signal from at least one of the plurality of sensors indicative of a composition of the fuel, using a flow model and the at least one signal, determine the physical properties of a fuel at an inlet to the flow control devices, and determine a corresponding correction to a gas fuel flow gain using the determined physical properties and automatically control fuel delivery as well as fuel split between the fuel injection points on the combustor using the adjusted flow gain to facilitate permitting a relatively large variation in the fuel composition for use in the gas turbine engine.

DETAILED DESCRIPTION OF THE INVENTION

While the methods and apparatus are herein described in the context of a gas turbine engine used in an industrial environment, it is contemplated that the method and apparatus described herein may find utility in other combustion turbine systems applications including, but not limited to, turbines installed in aircraft. In addition, the principles and teachings set forth herein are applicable to gas turbine engines using a variety of combustible fuels such as, but not limited to, natural gas, liquefied natural gas, gasoline, kerosene, diesel fuel, and jet fuel. The description herein below is therefore set forth only by way of illustration, rather than limitation.

Figure 1:
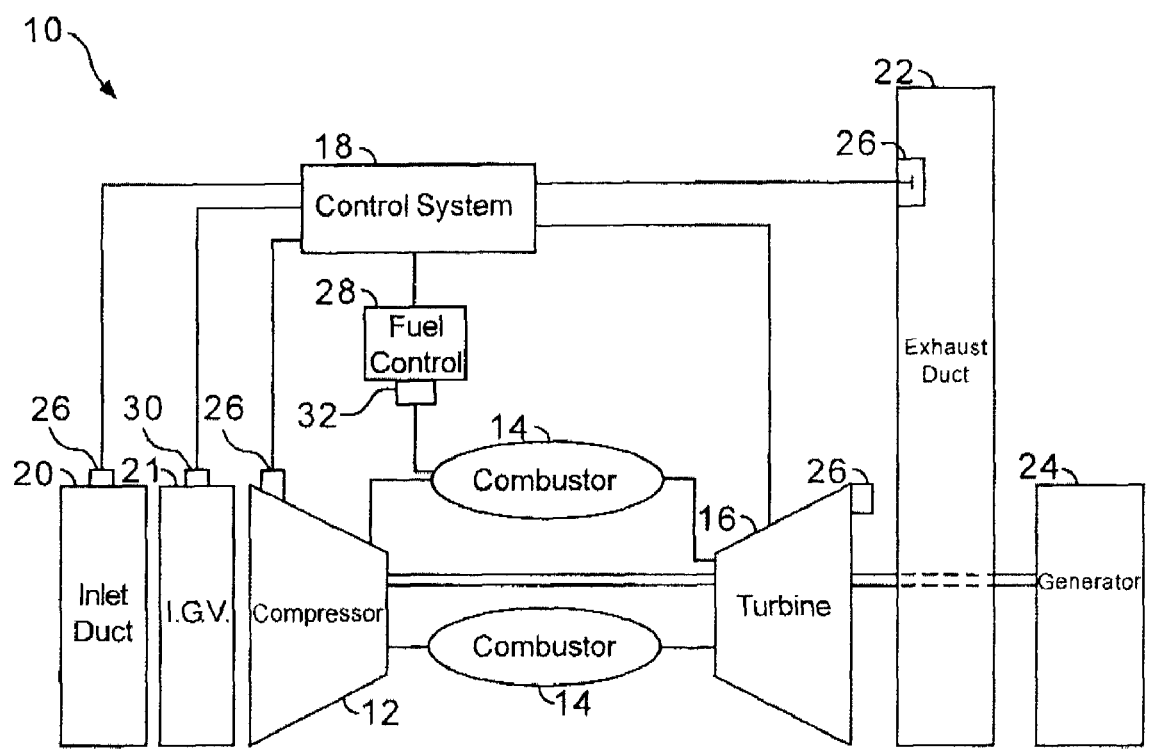
FIG. 1 is a schematic diagram of a gas turbine engine system in accordance with an embodiment of the present invention.

FIG. 1 is a schematic diagram of a gas turbine engine system 10 including a compressor 12, a combustor 14, a turbine 16 drivingly coupled to compressor 12, and a control system 18. An inlet duct 20 channels ambient air to the compressor. In one embodiment, injected water and/or other humidifying agent is also channeled to the compressor through inlet duct 20. Inlet duct 20 may have ducts, filters, screens and sound absorbing devices that contribute to a pressure loss of ambient air flowing through inlet duct 20 into one or more inlet guide vanes 21 of compressor 12. An exhaust duct 22 channels combustion gases from an outlet of turbine 16 through, for example, emission control and sound absorbing devices. Exhaust duct 22 may include sound adsorbing materials and emission control devices that apply a backpressure to turbine 16. The amount of inlet pressure loss and back pressure may vary over time due to the addition of components to ducts 20, 22, and to dust and dirt clogging the inlet and exhaust ducts. Turbine 16 may drive a generator 24 that produces electrical power. The inlet loss to compressor 12 and turbine exhaust pressure loss tend to be a function of corrected flow through the gas turbine. Further, the amount of inlet loss and turbine back-pressure may vary with the flow rate through the gas turbine.

The operation of the gas turbine engine system 10 may be monitored by several sensors 26 detecting various conditions of turbine 16, generator 24 and ambient environment. For example, temperature sensors 26 may monitor ambient temperature surrounding gas turbine engine system 10, compressor discharge temperature, turbine exhaust gas temperature, and other temperature measurements of the gas stream through the gas turbine engine. Pressure sensors 26 may monitor ambient pressure, and static and dynamic pressure levels at the compressor inlet and outlet, turbine exhaust, at other locations in the gas stream through the gas turbine. Humidity sensors 26, such as wet and dry bulb thermometers, measure ambient humidity in the inlet duct of the compressor. Sensors 26 may also comprise flow sensors, speed sensors, flame detector sensors, valve position sensors, guide vane angle sensors and other sensors that sense various parameters relative to the operation of gas turbine engine system 10. As used herein, "parameters" refer to physical properties whose values can be used to define the operating conditions of gas turbine engine system 10, such as temperatures, pressures, and gas flows at defined locations.

A fuel control system 28 regulates the fuel flowing from a fuel supply to combustor 14, and the split between the fuel flowing into various fuel nozzles located about the combustion chamber. Fuel control system 28 may also select the type of fuel for the combustor. The fuel control system 28 may be a separate unit or may be a component of control system 18. Fuel control system 28 may also generate and implement fuel split commands that determine the portion of fuel flowing to fuel nozzle subgroups.

Control system 18 may be a computer system having a processor(s) that executes programs to control the operation of the gas turbine using sensor inputs and instructions from human operators. The programs executed by the controller 18 may include scheduling algorithms for regulating fuel flow to combustor 14. The commands generated by the controller cause actuators on the gas turbine to, for example, adjust valves (actuator 32) between the fuel supply and combustors that regulate the flow, fuel splits and type of fuel flowing to the combustors; adjust inlet guide vanes 21 (actuator 30) on the compressor, and activate other control settings on the gas turbine.

Control system 18 regulates the gas turbine based, in part, on algorithms stored in computer memory of the controller. These algorithms enable control system 18 to maintain the $NO_x$ and CO emissions in the turbine exhaust to within certain predefined emission limits, and to maintain the combustor firing temperature to within predefined temperature limits. The algorithms have inputs for parameter variables for current compressor pressure ratio, ambient specific humidity, inlet pressure loss and turbine exhaust back pressure. Because of the parameters in inputs used by the algorithms, control system 18 accommodates seasonal variations in ambient temperature and humidity, and changes in the inlet pressure loss through the inlet 20 of the gas turbine and in the exhaust back pressure at the exhaust duct 22. Input parameters for ambient conditions, and inlet pressure loss and exhaust back pressure enable $NO_x$, CO and turbine firing algorithms executing in control system 18 to automatically compensate for seasonal variations in gas turbine operation and changes in inlet loss and in back pressure. Accordingly, the need is reduced for an operator to manually adjust a gas turbine to account for seasonal variations in ambient conditions and for changes in the inlet pressure loss or turbine exhaust back pressure.

The combustor 14 may be a DLN combustion system. Control system 18 may be programmed and modified to control the DLN combustion system and for determining fuel splits.

The schedules and algorithms executed by control system 18 accommodate variations in ambient conditions (temperature, humidity, inlet pressure loss, and exhaust back pressure) that affect $NO_x$ combustor dynamics, and firing temperature limits at part-load gas turbine operating conditions. Control system 18 simultaneously schedules exhaust temperature and combustor fuel splits. Control system 18 applies algorithms for scheduling the gas turbine, such as setting desired turbine exhaust temperatures and combustor fuel splits, so as to satisfy performance objectives while complying with operability boundaries of the gas turbine. Control system 18 simultaneously determines level combustor temperature rise and $NO_x$ during part-load operation in order to increase the operating margin to the combustion dynamics boundary and thereby improve operability, reliability, and availability of the gas turbine.

The combustor fuel splits are scheduled by control system 18 to maintain the desired combustion mode while observing other operability boundaries, such as combustion dynamics. At a given load level, the cycle match point and the combustor fuel splits influence the resultant $NO_x$ emissions. Simultaneously leveling $NO_x$ and combustor temperature rise during part-load operation minimizes the level of combustion dynamics and expands the operational envelope of the gas turbine without adversely impacting emissions compliance or parts life.

Combustors 14 include a plurality of fuel control valves supplying two or more injector groups in each combustor to allow modulation of modes of operation, emissions and combustion dynamics levels versus machine load. By modulating fuel splits among the several fuel gas control valves, emissions and dynamics are optimized over the machine load range. Fuel split modulation depends on a calculated reference parameter, called combustion reference temperature, which is a function of machine exhaust temperature and other continuously monitored machine parameters.

Embodiments the invention descried herein define a method and control system to manage the fuel flow to a combustion system in for example, a combined cycle power plant of varying fuel composition and heating value. A method of controlling fuel flow that permits smooth transitions when fuel property changes are significant is used to minimize disturbances to the electrical grid as well as maintain stack emissions within predetermined limits. Fuel moisturization systems are employed to improve overall combined cycle performance of the power plant. A method of compensating for fuel composition changes resulting from humidification of the fuel is used to facilitate combustion system operation under fault conditions of the moisturization system as well as during normal startup and loading operation of the combined power plant. A large change in fuel composition and/or heating value could result in combustor flame stability issues such as loss of flame or excessive temperature and could cause the generating unit to trip off line.

An imbedded flow model is used to determine the appropriate timing for adjustment of the fuel system flow gain since devices used to measure fuel composition and moisture content are typically only available well upstream of the gas control valve.

Figure 2:
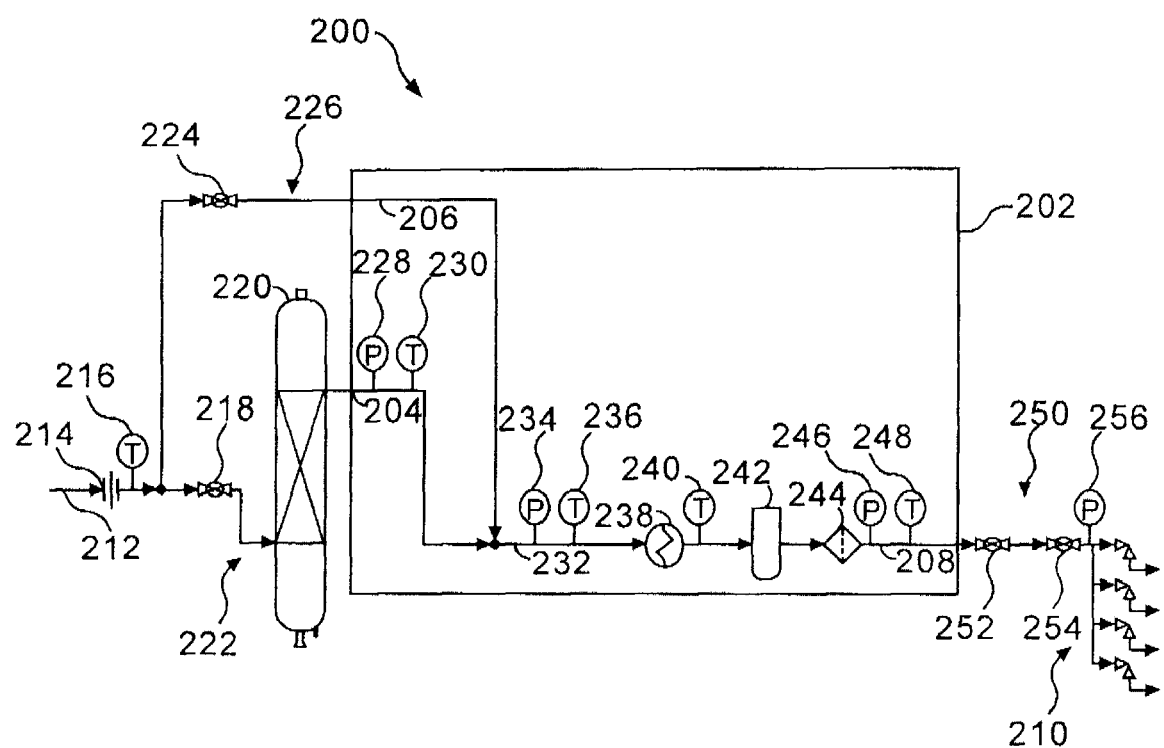
FIG. 2 is a schematic diagram of an exemplary fuel system flow network that may be used with the system shown in FIG. 1.

FIG. 2 is a schematic diagram of an exemplary fuel system flow network 200 in accordance with an embodiment of the present invention. In the exemplary embodiment, a control volume of interest 202 includes a first inlet flow stream 204, a second inlet flow stream 206, and a single outlet stream 208 feeding one or more gas control valves 210. An inlet fuel header 212 includes a flow orifice 214 and a temperature sensor 216. Header 212 supplies a tower inlet control valve 218 and a fuel moisturization tower 220 through a first branch 222 and supplies a tower bypass control valve 224 through a second branch 226. First inlet flow stream 204 includes pressure and temperature sensors, 228, and 230, respectively. First inlet flow stream 204 and second inlet flow stream 206 combine at a common fuel header 232. In the exemplary embodiment, common fuel header 232 includes in serial flow relationship, a pressure sensor 234, a temperature sensor 236, a performance heater 238, a temperature sensor 240, a scrubber 242, a strainer 244, a pressure sensor 246, and a temperature sensor 248. An outlet fuel header 250 includes an auxiliary stop valve 252, a safety relief valve 254, a pressure sensor 256, and one or more gas control valves 210.

To accurately control fuel delivery to the combustion system the physical properties of the fuel at the main fuel control elements such as gas control valves 210 should be known. For fuels that vary little in composition, the fuel constituents and physical properties may be assumed to be constant and physical parameters such as pressure and temperature may be used to control fuel to the gas turbine. In some cases, the physical properties of the fuel may vary significantly resulting in such assumptions being erroneous or inaccurate.

In some combustion systems that utilize fuel moisturization systems, the physical properties of the fuel may vary significantly during normal loading/unloading as well as restart following a system upset or during trip conditions. During normal loading and unloading moisture is added to the fuel gas for combined cycle performance benefits when sufficient energy is available in the bottoming cycle and conditions are favorable in the combustion system. The addition of moisture to the fuel changes the physical properties substantially, and as a result the fuel control system is tasked with making corresponding adjustments to either the fuel command or the fuel system flow gain accordingly.

When physical property measurement is neither available between the moisturization tower and the gas control valve/s (GCV's) nor practical to measure continuously, a physical flow model is utilized to predict the fuel properties at the inlet of the GCV. The flow model represents the water vapor content and the physical transport delay of the fluid through the system. An assumption may be made that no additional natural gas fuel or water is added to the fluid stream downstream of the fuel moisturization tower. The water vapor mole fraction calculated at the fuel moisturization tower exit is fed to the flow model, and then calculated at the gas control valve inlet continuously based on the boundary conditions in the system. The physical properties exiting the tower can be measured as water added to the dry natural gas inlet fuel and at the subsequent physical properties at the GCV will be determined based on, but not limited to, the mixture temperature, pressure, flow velocity, and volumes in the system. The water vapor mole fraction calculated at the GCV is then used in the physical property calculations that follow to appropriately adjust the flow gain to re-linearize the fuel command and minimize load transients that would have occurred during the transfer without the adjustment.

The control system utilizes the flow model to appropriately time the flow gain adjustment which uses the physical properties of the fuel at the gas control valve inlet to correct for the expected changes that can result from the changing physical properties.

The mole fraction of water vapor of a saturated natural gas mixture exiting a fuel moisturization tower, can be determined from Henry's Law:

$$x_w = \frac{P_w}{H} \quad (1)$$

Where;
H=Henry's law constant for the gas at a given P & T condition
$P_w$=Partial pressure of water vapor in the natural gas/water vapor mixture; and
$x_W$=mole fraction of water vapor in a natural gas/water vapor mixture.

An approximation of the vapor pressure can also be obtained by utilizing an empirically derived saturation curve of the fuel gas.

$$X_w = f(T,P)_{Fmexit} \quad (2)$$

Assuming two inlet flow streams 204 and 206, dry gas from tower bypass valve 224 and wet (saturated) gas exiting fuel moisturization tower 220, are the only input streams to control volume 202, the inlet flow streams 204 and 206 mix and progress downstream within control volume 202. The mixed flow stream parameters within control volume 202 are determined based on the inlet conditions and parameterization of the flow model. The dry gas entering the control volume can be assumed to have a constant composition and the wet stream composition is based on water vapor added to the dry gas stream.

Using Gibb's theorem, a physical property of an ideal-gas mixture, $P_{mix}$, is the sum of the properties of each individual species in the mixture, $P_i$. This can be expressed generally as:

$$P_{mix} = \sum_{i=1}^{n} x_i P_i \tag{3}$$

Where;
$P_i$=physical property for each species in mixture;
$x_i$=mole fraction of each species in the mixture; and
n=total number of species in the mixture.

Given the mole fractions of each species in the dry natural gas inlet mixture, the molar mass $MW_{f\_dry}$, can be expressed as:

$$MW_{f\_dry} = \sum_{i=1}^{n} x_{i\_dry} MW_{i\_dry} [lb_m/lb_{mole}] \tag{4}$$

Where;
$x_{i\_dry}$=mole fraction of each species in the dry natural gas mixture.
$MW_{i\_dry}$=molecular weight of each species in the dry natural gas mixture [$lb_{m\_i}/lb_{mole\_i}$].

In the same fashion, the ideal heat capacity of the dry natural gas mixture at constant pressure $c^{ig}_{p\_f\_dry}$ can be expressed as:

$$c^{ig}_{p\_f\_dry}(T) = \sum_{i=1}^{n} x_{i\_dry} c^{ig}_{p\_i\_dry}(T) [BTU/lb_{mole}{}^\circ R] \tag{5}$$

Where;
$c^{ig}_{p\_i\_dry}$=heat capacity at constant pressure of the each species in the dry natural gas mixture [BTU/$lb_{mole}{}^\circ$ R].

Given the composition of the dry natural gas stream, $x_{i\_dry}$, and by calculating the mole fraction of the water vapor in the wet natural gas stream, the composition of the wet natural gas stream, $x_{j=2}$, can then expressed as:

$$x_{i\_wet} = (1-x_{H2O})x_{i\_dry} \tag{6}$$

Where;
$x_{H2O}$=mole fraction of water vapor in the saturated natural gas mixture.
$x_{i\_wet}$=mole fraction of each species in the saturated natural gas mixture.

Similarly, the per mole lower heating value of the dry gas mixture can be calculated as follows:

$$LHV_{f\_mix} = \sum_{i=1}^{n} x_i LHV_i [BTU/lb_{mole}] \tag{7}$$

Where:
$LHV_{f\_mix}$=lower heating value of the dry natural gas mixture. [BTU/$lb_{mole\_f}$];
$LHV_i$=lower heating value of element i in the dry natural gas mixture [BTU/$lb_{mole\_i}$]; and
$x_i$=mole fraction of each species in the dry natural gas mixture [$lb_{m\_i}/lb_{mole\_i}$].

A molar physical property P for a saturated natural gas mixture can then be expressed as a summation of the dry natural gas mixture and water vapor gas properties according to the following general equation:

$$P_{f+H2O} = (1-x_{H2O})P_{f\_dry} + x_{H2O}P_{H2O} \tag{8}$$

Where:
$P_{f+H2O}$=Physical property of saturated natural gas mixture. [unit/$mole_{mix}$];
$P_f$=Physical property of dry natural gas mixture. [unit/$mole_f$];
$P_{H2O}$=Physical property of water. [unit/$mole_{H2O}$]; and
$x_{H2O}$=Molar fraction of water in saturated natural gas mixture.

The molar mass of the saturated natural gas mixture, $MW_{f+H2O}$, can be expressed as:

$$MW_{f+H2O} = (1-x_{H2O})MW_{f\_dry} + x_{H2O}MW_{H2O} [lb_{m\,f+H2O}/lb_{mole\,f+H2O}] \tag{9}$$

Where:
$MW_{f+H2O}$=Molar weight of saturated natural gas mixture [$mass_{f+H2O}/mole_{f+H2O}$]
$MW_{f\_dry}$=Molar weight of dry fuel mixture [$mass_{f\_dry}/mole_{f\_dry}$]
$MW_{H2O}$=molar mass of water; [$mass_{H2O}/mole_{H2O}$]
$x_{H2O}$=Molar fraction of water in saturated natural gas mixture.

The molecular Lower Heating Value of the saturated natural gas mixture $LHV_{f+H2O}$, can then be expressed as:

$$LHV_{f+H2O} = (1-x_{H2O})LHV_{f\_dry} + x_{H2O}LHV_{H2O} [BTU/lb_{mole}] \tag{10}$$

Where;
$LHV_{f\_dry}$=lower heating value of dry gas mixture [BTU/$lb_{mole\,f\_dry}$];
$LHV_{H2O}$=lower heating value of water=0 [BTU/$lb_{mole\_H2O}$]; and
$x_{H2O}$=Molar fraction of water in fuel water mixture.

The ideal gas constant for the saturated natural gas mixture, $R_{xf+H2O}$, can be calculated using the following equations:

$$R_{1f+H2O} = \frac{R_{univ1}}{(1-x_{H2O})MW_{f\_dry} + x_{H2O}MW_{H2O}} \tag{11}$$

$$= \frac{R_{univ1}}{MW_{f+H2O}},$$

$$[BTU/(lb_{mass}{}^\circ R)]$$

$$R_{2f+H2O} = \frac{R_{univ2}}{(1-x_{H2O})MW_{f\_dry} + x_{H2O}MW_{H2O}} \tag{12}$$

$$= \frac{R_{univ2}}{MW_{f+H2O}},$$

$$[lb_f^* ft/(lb_{mass}{}^\circ R)]$$

Where:
$MW_{f+H2O}$=Molar weight of saturated natural gas mixture [$mass_{f+H2O}/mole_{f+H2O}$]
$R_{univ\,1}$=1.98588. [BTU/($lb_{mole}{}^\circ$ R)]
$R_{univ\,2}$=1545.32. [$lb_f^*$ft/($lb_{mole}{}^\circ$ R)]

The ideal heat capacity of the saturated natural gas mixture at constant pressure $c^{ig}_{pf+H2O}$ can be expressed as:

$$c_{p\_f+H2O}^{ig} = \left( \frac{(1-x_{H2O})c_{p\_f\_dry}^{ig} + x_{H2O}c_{pH2O}^{ig}}{(1-x_{H2O})MW_{dry} + x_{H2O}MW_{H2O}} \right) [BTU/lb_m °R] \quad (13)$$

Where:

$c_{p\_f+H2Oj}^{ig}$=heat capacity at constant pressure of the saturated natural gas mixture [BTU/lb$_m$° R]

$c_{p\_f\_dry}^{ig}$=heat capacity at constant pressure of dry natural gas mixture. [BTU/lb$_{mole}$° R]

$c_{p\_H2O}^{ig}$=heat capacity at constant pressure of water. [BTU/lb$_{mole}$° R]

Once $c_{p\,f+H2O}$ is known, the ideal heat capacity at constant volume of the saturated natural gas mixture, $c_{v\,f+H2O}^{ig}$, can be expressed as:

$$c_{v\_f+H2O}^{ig} = c_{p\_f+H2O}^{ig} - R_{t\_f+H2O} \ [BTU/lb_m °R] \quad (14)$$

Where:

$c_{v\_f+H2O}^{ig}$=heat capacity at constant volume of the gas/water mixture. [BTU/lb$_m$°R]

The specific heat ratio of the saturated natural gas mixture, $k_{f+H2O}$, is calculated as:

$$k_{f+H_2O} = \frac{c_{pf+H2O}^{ig}}{c_{vf+H2O}^{ig}} \quad (15)$$

The density of a gas mixture j can be calculated from the ideal gas law:

$$\rho_j = \frac{P \cdot 144}{Z_j R_{2\_j} \cdot T_R} [lb_m/SCF] \quad (16)$$

Where:
P=gas pressure [psia]
$Z_j$=gas compressibility factor
$T_R$=gas temperature [° R]

The ideal specific gravity, or density ratio, of the gas mixture j at standard conditions can be simplified to the molar mass ratio of the fuel mixture to air:

$$SG_j = \frac{\rho_{jSTP}}{\rho_{airSTP}} = \frac{MW_j}{MW_{air}} = \frac{MW_j}{28.95} \quad (17)$$

The temperature of the gas mixture stream at any point j can be expressed converted to Rankine or Kelvin from the following standard conversion equations:

$$T_{R,j} = T_{F,j} + 459.67 \quad (18)$$

$$T_{K,j} = \frac{T_{R,j}}{1.8} \quad (19)$$

Where:
$T_{F,j}$=Gas mixture temperature. [° F.]
$TR,j$=Gas mixture temperature. [° R]
$TK,j$=Gas mixture temperature. [° K]

The modified wobbe index of a gas mixture j, MWIj, can be expressed as:

$$MWI_j = \frac{LHV_{v\_j}}{\sqrt{SG_j \cdot T_R}} \quad (20)$$

Where:
LHV,$_{v\_j}$=Volumetric Lower heating value of j. [BTU/SCF]
$T_R$=Gas Temperature. [° R]
SG,$_j$=Specific gravity of j compared to standard density of air.

It follows that the modified wobbe index of a saturated natural gas mixture can be determined by the equation below:

$$MWI_{f+H2O} = \frac{LHV_{v\_f+H2O}}{\sqrt{SG_{f\_H2O} \cdot T_R}} \quad (21)$$

The volumetric lower heating value of the fuel mixture can be determined according to the following equation.

$$LHV_{v\_f+H2O} = \frac{(1-x_{H2O})MW_f}{MW_{f+H2O}} \frac{LHV_{v\_f} \cdot \rho_{STP\_f+H2O}}{\rho_{STP\_f}} \quad (22)$$

Where:
LHV,$_{v\_f+H2O}$=Volumetric Lower heating value of saturated natural gas mixture. [BTU/SCF$_{f+H2O}$]
X$_{H2O}$=Mole fraction of water. [lbmole$_{H2O}$/lbmole$_{f+H2O}$]
$\rho,_{STP\_f}$=Standard density of dry natural gas mixture. [lbm/SCF$_f$]
$\rho,_{STP\_f+H2O}$=Standard density of saturated natural gas mixture. [lbm$_{f+H2O}$/SCF$_{f+H2O}$]

The following simplifications can be made for the ratio of standard densities:

$$\frac{\rho_{STP\_f+H2O}}{\rho_{STP\_f}} = \frac{MW_{f+H2O}}{MW_f} \quad (23)$$

Where:
MW$_{f+H2O}$=Molecular weight of saturated natural gas mixture. [lbm$_{f+H2O}$/lbmole$_{f+H2O}$]
MW$_f$=Molecular weight of dry natural gas mixture. [lbm$_f$/lbmole$_f$]
X$_{H2O}$=Mole fraction of water. [Moles$_f$/Moles$_{f+H2O}$]
$\rho,_{STP\_f}$=Standard density of dry natural gas mixture. [lbm/SCF]
$\rho,_{STP\_f+H2O}$=Standard density of saturated natural gas mixture. [lbm/SCF]

Substituting equation 23 into equation 22 gives the following simplified equation for the heating value of the saturated natural gas mixture.

$$LHV_{v\_f+H2O} = (1-x_{H2O}) \cdot LHV_{v\_f} \quad (24)$$

Where,
LHV,v_f=Volumetric Lower heating value of dry natural gas mixture. [BTU/SCF]
LHV,v_f+H2O=Volumetric Lower heating value of saturated natural gas mixture. [BTU/SCF]
xH2O=Molar fraction of water in saturated natural gas mixture. [moles$_{H2O}$/moles$_{f+H2O}$]

Substituting equation 24 into equation 21 and simplifying for the specific gravity, gives the following expression for modified wobbe index of the saturated natural gas mixture:

$$MWI_{F+h2o} = \frac{(1-x_{H2O}) \cdot LHV_{v\_f}}{\sqrt{\frac{(1-x_{H2O})MW_f + x_{H2O}MW_{H2O}}{28.95} \cdot T_R}} \quad (25)$$

Where:

$LHV_{v\_f}$=Volumetric Lower heating value of dry natural gas mixture. [BTU/SCF]

$MW_{f+H2O}$=Molecular weight of saturated natural gas mixture. [$lbm_{f+H2O}$/$lbmole_{f+H2O}$]

$MW_f$=Molecular weight of dry natural gas. [$lbm_f$/$lbmole_f$]

$X_{H2O}$=Mole fraction of water.

It is particularly important in gas turbine combustion systems to maintain proper fuel control. Gas turbines equipped with Dry Low $NO_x$ (DLN) combustion systems typically utilize fuel delivery systems that include multi-nozzle, pre-mixed combustors. DLN combustor designs utilize lean pre-mixed combustion to achieve low $NO_x$ emissions without using diluents such as water or steam. Lean premixed combustion involves premixing the fuel and air upstream of the combustor flame zone and operation near the lean flammability limit of the fuel to keep peak flame temperatures and $NO_x$ production low. To deal with the stability issues inherent in lean premixed combustion and the wide fuel-to-air ratio range that occurs across the gas turbine operating range, DLN combustors typically have multiple fuel nozzles in each combustion chamber that are fueled individually or in sub-groups. The gas turbine fuel system has a separately controlled delivery circuit to supply each group of nozzles in each chamber. The control system will vary the fuel flow (fuel split) to each circuit over the turbine operating range to maintain flame stability, low emissions, and acceptable combustor life. Fuel flow to each nozzle sub-group is controlled via a gas control valve (GCV). The fuel split acts to divide the total fuel command (Fuel Stroke Reference) amongst the active GCV's, and the resulting percentage GCV fuel flow command must be converted to a valve position to achieve the desired fuel flow to the nozzle sub-group.

The technique used to convert the percentage GCV flow command to valve position is to determine the gas fuel system flow gain in terms of valve flow capacity coefficient, $C_g$. The valve capacity coefficient is the translated to valve position using the known valve flow characteristic. This allows the use of multiple valves with varying capacities. The flow gain, also called GCV flow scalar, is based on the maximum required $C_g$ during the maximum fuel flow operating condition. The flow gain calculation method is defined as follows and provides adequate margin at the maximum flow condition:

$$DesignFlowScalar = \frac{C_{gBaseColdDay}}{83.3} \quad (26)$$

To determine the required $C_g$ at base load cold day the Universal Valve Flow equation is used:

$$Q = \sqrt{\frac{520}{SG \cdot T \cdot Z}} C_g C_2 F_p P_{in} \sin\left[\frac{3417}{C_1 C_2}\sqrt{\frac{\Delta P}{P_{in}}}\right]_{deg} \quad (27)$$

$$C_2 = \left(\frac{1}{0.4839}\right)\sqrt{\left(\frac{k}{k+1}\right)\left(\frac{2}{k+1}\right)^{\left(\frac{2}{k-1}\right)}}$$

Where:

Q=Gas Volumetric Flow Rate [scfh]

$F_p$=Piping Geometry Factor (1.0 assumed)

$P_{in}$=Upstream Static Gas Fuel Pressure [PSIA]

$\Delta P$=Valve Differential Pressure [PSID]

SG=Gas Fuel Specific Gravity [ ]

K=Ratio of Specific Heats [ ]

T=Valve Inlet Gas Temperature (° R)

Z=Gas Fuel Compressibility Factor

C1=Valve Pressure Recovery Coefficient

C2=Correction Coefficient for Gas Fuel Ratio of Specific Heats $C_g$ represents Valve Capacity Coefficient

*Note that the sin term is limited to 90 deg. If the valve $\Delta P$ is high enough to cause critical or choked flow the sin term is equal to 1.

In order to determine $C_g$ at base cold day the gas fuel mass flow rate, standard density, specific heat ratio, compressibility, temperature, heating value, specific gravity, and supply pressure must all be known.

The max $C_g$ can be calculated as follows:

$$C_g = \frac{Q_{BaseColdDay}}{C_2 P_{in}\sqrt{\frac{520}{SG \cdot T \cdot Z}}} \quad (28)$$

$$= \frac{\dot{m}_{BaseColdDay} \cdot 3600/\rho_{std}}{C_2 P_{in}\sqrt{\frac{520}{SG \cdot T \cdot Z}}}$$

Assuming the GCV's are choked and the piping friction factor is 1:

$$C_2 = \left(\frac{1}{0.4839}\right)\sqrt{\left(\frac{k}{k+1}\right)\left(\frac{2}{k+1}\right)^{\left(\frac{2}{k-1}\right)}} \quad (29)$$

The inputs used to calculate the flow gain are dependant on fuel constituents and the application of this flow conversion technique is limited to applications with fairly constant fuel properties. Traditional methods using the flow gain assume the fuel properties are constant throughout the loading range, which is not always the case. Therefore, without correcting for changes in fuel properties the flow gain will not properly linearize the flow command across the loading range. This can lead to an undesirable droop non-linearity and can cause load transients where fuel properties change significantly, for example during the transfer from dry to wet fuel or following large changes in fuel temperature.

To correct for the expected changes in fuel properties that can result from either changing the fuel temperature or moisture content, the ratio of actual to design $C_g$ ratio can be used to bias the flow gain.

The $C_g$ correction ratio can be expressed as:

$$\frac{C_{gactual}}{C_{gdesign}} = \frac{\left[\frac{Q}{C_2 P_{in}\sqrt{\frac{520}{SG \cdot T \cdot Z}}}\right]_{actual}}{\left[\frac{Q}{C_2 P_{in}\sqrt{\frac{520}{SG \cdot T \cdot Z}}}\right]_{design}} \quad (30)$$

-continued $$\frac{C_{gactual}}{C_{gdesign}} = \frac{\left[\frac{HC \cdot 10^6 / LHV_{mixv}}{C_2 P_{in} \sqrt{\frac{520}{SG \cdot T \cdot Z}}}\right]_{actual}}{\left[\frac{HC \cdot 10^6 / LHV_{mixv}}{C_2 P_{in} \sqrt{\frac{520}{SG \cdot T \cdot Z}}}\right]_{design}} \quad (31)$$

Where:
HC represents Gas Turbine Heat Consumption at the given load condition [MBTU/hr]

Substituting $MWI_{-v}$ in the relationship gives the following:

$$\frac{C_{gactual}}{C_{gdesign}} = \frac{\left[\frac{HC\sqrt{Z}}{C_2 P_{in} MWI}\right]_{actual}}{\left[\frac{HC\sqrt{Z}}{C_2 P_{in} MWI}\right]_{design}} \quad (32)$$

By representing all variable terms as a ratio of actual/design values the following relationship can be attained:

$$C_{gratio} = \frac{HC_{ratio} \cdot \sqrt{Z_{ratio}}}{P_{inratio} \cdot C_{2ratio} \cdot MWI_{ratio}} \quad (33)$$

The $P_{in\ ratio}$ can be expressed as follows:

$$P_{inratio} = \frac{P_{2actual}}{P_{2design}} \quad (34)$$

Where:
$P_{2\ actual}$ represents Measured $P_2$ pressure [PSIA]
$P_{2\ design}$ represents Design $P_2$ pressure [PSIA] used in the design fuel gain calculation.

The $HC_{ratio}$ can be expressed as follows:

$$HC_{ratio} = \frac{x_{H2Oactual}}{x_{H2Odesign}} \cdot K_{HC} \quad (35)$$

Where:
$K_{HC}$ represents Heat consumption scalar coefficient
$X_{H2O\ design}$ represents Design H2O mole fraction used in the design fuel gain calculation To obtain the $C_2$ ratio an expression for specific heat ratio, k, is required. Specific heat ratio is calculated using equations 10, 14, and 15.

Using the calculated specific heat ratio C2 can be calculated using the following equation:

$$C_2 = \left(\frac{1}{0.4839}\right) \sqrt{\left(\frac{k}{k+1}\right) \left(\frac{2}{k+1}\right)^{\left(\frac{2}{k-1}\right)}} \quad (36)$$

C2 Ratio can then be calculated using the following equation:

$$C_{2ratio} = \frac{C_{2actual}}{C_{2design}} \quad (37)$$

MWI Ratio can then be calculated using the following equation:

$$MWI_{ratio} = \frac{MWI_{actual}}{MWI_{design}} \quad (38)$$

The compressibility ratio can be calculated using the following equation:

$$Z_{ratio} = \frac{Z_{actual}}{Z_{design}} \quad (39)$$

The dynamic flow gain for use in the control system can then be expressed as:

$$AdjustedFlowGain = DesignFlowGain \cdot C_{gratio} \quad (40)$$

Figure 3:
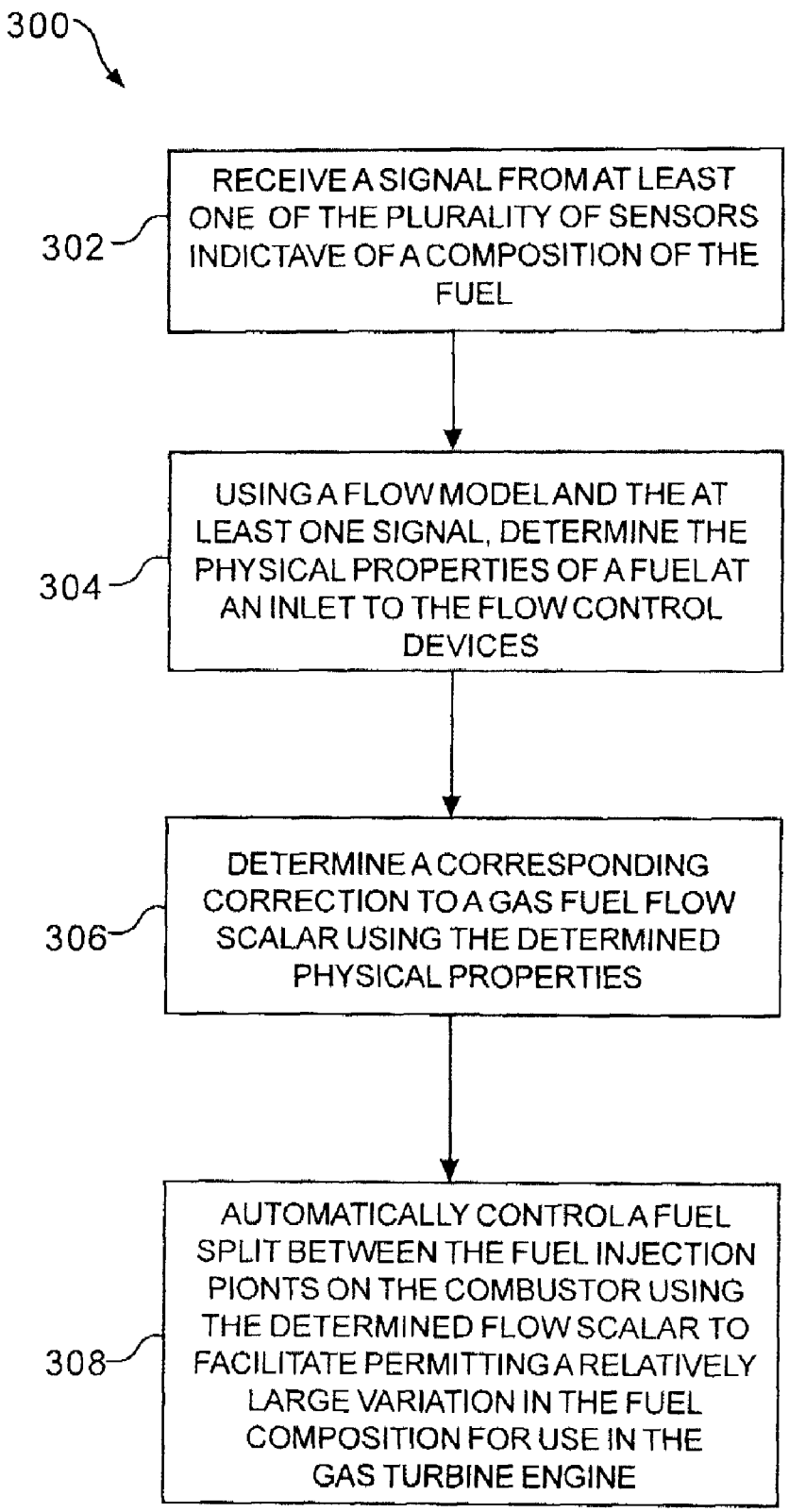
FIG. 3 is a flow chart of an exemplary method of operating a gas turbine engine in accordance with an embodiment of the present invention.

FIG. 3 is a flow chart of an exemplary method 300 of operating a gas turbine engine in accordance with an embodiment of the present invention. In the exemplary embodiment, method 300 includes receiving 302 a signal from at least one of a plurality of sensors indicative of a composition of a fuel for the gas turbine engine. A flow model is used 304 with the at least one signal to determine the physical properties of the fuel at an inlet to fuel flow control devices. Method 300 also includes determining 306 a corresponding correction to a gas fuel flow gain using the determined physical properties and automatically controlling 308 fuel delivery as well as fuel split between the fuel injection points on the combustor using the adjusted flow gain to facilitate permitting a relatively large variation in the fuel composition for use in the gas turbine engine.

The above-described methods and apparatus provide a cost-effective and reliable means for automatically and continuously determining the physical properties of a fuel gas at the gas control valve inlet using a flow model and determining a corresponding correction to a gas fuel flow gain from those physical properties. As a result, the methods and apparatus described herein facilitate gas turbine engine operation in a cost-effective and reliable manner.

An exemplary methods and apparatus for automatically and continuously determining the physical properties of a fuel gas at the gas control valve inlet using a flow model and determining a corresponding correction to a gas fuel flow gain are described above in detail. The apparatus illustrated is not limited to the specific embodiments described herein, but rather, components of each may be utilized independently and separately from other components described herein. Each system component can also be used in combination with other system components.

A technical effect of the method and apparatus is to provide a system that automatically and continuously determines the physical properties of a fuel gas at the gas control valve inlet using a flow model and determining a corresponding adjustment to a gas fuel flow gain from those physical properties to permit a relatively large variation in the fuel composition for use in the gas turbine engine.

While the invention has been described in terms of various specific embodiments, those skilled in the art will recognize that the invention can be practiced with modification within the spirit and scope of the claims.

What is claimed is:

1. A gas turbine engine system comprising:
an electrical generator configured to provide electrical energy to a load;
a gas turbine engine comprising at least one combustor including a plurality of fuel injection points configured to receive a flow of fuel from a plurality of corresponding flow control devices; and
a fuel control system comprising:
a plurality of sensors positioned about the gas turbine engine system and configured to measure at least one parameter associated with the sensor; and
a processor programmed to:
receive a signal from at least one of the plurality of sensors indicative of a composition of the fuel;
using the at least one fuel composition signal and a flow model that represents a water vapor content of the fuel to determine the physical properties of a fuel at an inlet to the flow control devices;
determine a corresponding correction to a gas fuel flow gain using the determined physical properties; and
automatically control fuel delivery and fuel split between the fuel injection points on the combustor using the determined flow gain to facilitate permitting a relatively large variation in the fuel composition for use in the gas turbine engine.

2. A gas turbine engine system in accordance with claim 1 wherein the at least one combustor including a plurality of fuel injection points is configured to inject the fuel into said combustor at a plurality of different locations.

3. A gas turbine engine system in accordance with claim 1 wherein said processor is further programmed to determine the physical properties of the fuel automatically and continuously.

4. A gas turbine engine system in accordance with claim 1 wherein said processor is further programmed to determine the physical properties of the fuel using only the fuel temperature and pressure when the fuel composition is determined to be substantially constant.

5. A gas turbine engine system in accordance with claim 1 wherein the physical properties of the fuel comprises a moisture content of the fuel.

6. A gas turbine engine system in accordance with claim 1 wherein said processor is further programmed to adjust at least one of a fuel command and a fuel system flow gain in response to a change in at least one of a moisture content of the fuel and a change in the heating value of the fuel.

7. A gas turbine engine system in accordance with claim 1 wherein said processor is further programmed to adjust a fuel system flow gain in response to a change in at least one of a moisture content of the fuel and a change in the heating value of the fuel such that a fuel command remains substantially linearly related to generator load.

8. A gas turbine engine system in accordance with claim 1 wherein said processor is further programmed to time a flow gain adjustment to re-linearize a fuel command and facilitate minimizing load transients.

9. A gas turbine engine system in accordance with claim 1 wherein said fuel control system comprises a fuel moisturization tower, said processor is further programmed to:
determine a water vapor mole fraction at the fuel moisturization tower exit; and
determine a water vapor mole fraction at the flow control devices continuously based on the boundary conditions in the system.

10. A gas turbine engine system in accordance with claim 9 wherein the boundary conditions in the system include at least one of temperature, pressure, flow velocity, and volumes in the system.

11. A gas turbine engine system in accordance with claim 1 wherein said processor is further programmed to predict a water vapor mole fraction during upset conditions and when the system is tripped offline, the prediction based on a determination of the degree of condensation of water vapor in the pipeline using the temperature and pressure drop in the system.

12. A method of operating a gas turbine engine having a fuel control system including a fuel moisturizer and at least one fuel flow control device, said method comprising:
receiving a signal indicative of a composition of the fuel;
determining physical properties of the fuel at an inlet to the at least one flow control device using the fuel composition signal and a flow model that represents a water vapor content of the fuel;
determining a corresponding correction to a gas fuel flow gain using the determined physical properties; and
automatically controlling fuel delivery and fuel split between the fuel injection points on the combustor using the determined flow gain.

13. A method in accordance with claim 12 wherein determining physical properties of the fuel comprises determining a moisture content of the fuel.

14. A method in accordance with claim 12 wherein determining a corresponding correction to a gas fuel flow gain comprises determining a corresponding correction to a gas fuel flow gain using the physical properties of the fuel at the flow device inlet to correct for at least one of changing the fuel temperature or moisture content.

15. A method in accordance with claim 13 wherein the flow model comprises a plurality of flow component modules that each represent a component in the fuel system wherein a determined outlet temperature and pressure at each module is used as the inlet temperature and pressure at a subsequent module.

16. A fuel control system comprising:
a fuel inlet configured to admit a flow of fuel into the fuel control system;
a fuel moisturizer coupled in flow communication with said fuel inlet through a first pipe component;
at least one flow control device configured to modulate flow to one or more injection points in a fuel control system load, said at least one flow control device coupled in flow communication with said fuel moisturizer through a second pipe component;
a plurality of sensors positioned about the fuel control system and configured to measure at least one parameter associated with the sensor; and
a processor programmed to:
receive a signal from at least one of the plurality of sensors indicative of a composition of the fuel;
using the at least one fuel composition signal and a flow model that represents the water vapor content of the fuel to determine the physical properties of the fuel at an inlet to the flow control devices;
determine a corresponding correction to a gas fuel flow gain using the determined physical properties; and
automatically control fuel delivery and fuel split between the fuel injection points on the combustor using the determined flow gain to facilitate permitting a relatively large variation in the fuel composition for use in the gas turbine engine.

17. A fuel control system in accordance with claim 16 wherein said processor is further programmed to determine the physical properties of the fuel automatically and continuously.

18. A fuel control system in accordance with claim 16 wherein said processor is further programmed to determine the physical properties of the fuel using only the fuel temperature and pressure when the fuel composition is determined to be substantially constant.

19. A fuel control system in accordance with claim 16 wherein said flow model is configured to determine a timing for the gain adjustment that corresponds to a physical transport delay in the system between a fuel composition and moisture content measurement point and the inlet to the flow control devices.

20. A fuel control system in accordance with claim 16 wherein the flow model is configured to:
- receive a water content of the fuel determined at the fuel moisturizer exit;
- determine a water content of the fuel at the at least one flow control device inlet continuously based on at least one of the saturated natural gas mixture temperature, pressure, flow velocity, and volumes in the system; and
- determine a timed flow gain adjustment to re-linearize a fuel command to the at least one flow control devices.

* * * * *